United States Patent Office 2,894,931
Patented July 14, 1959

2,894,931

COMPOSITIONS CONTAINING POLYHYDROXY ETHERS OF PHENOL-ALDEHYDE RESINS AND POLYMETHYLOL PHENOL ETHERS

George R. Somerville, Morris Plains, and Harry W. Howard, South Orange, N.J., assignors to Shell Development Company, New York, N.Y., a corporation of Delaware No Drawing. Application September 23, 1955
Serial No. 536,298

5 Claims. (Cl. 260—43)

This invention relates to new compositions of matter containing polyhydroxy compounds. More particularly, the invention relates to compositions containing polyhydroxy ethers of phenol-aldehyde resins which compositions may be cured to form resinous products which are particularly adapted as protective surface coatings.

Specifically, the invention provides new compositions of matter which may be cured, preferably in the presence of acidic curing agents, to form resinous products having excellent resistance to solvents and corrosive liquids and have good flexibility and impact resistance. These new compositions comprise a mixture of (1) a polyol comprising a polyhydroxy ether of a phenol aldehyde resin, and (2) a methylol-substituted aromatic compound. The invention further provides as a preferred embodiment compositions comprising (1) a polyol comprising a poly(hydroxyethyl) ether of a phenol-aldehyde resin, and (2) a minor proportion (less than 50% by weight) of a trimethylol phenol ether, and particularly a trimethylol phenol allylic ether.

It is an object of the invention to provide new compositions of matter containing a polyhydroxy ether of a phenol-aldehyde resin. It is a further object to provide new compositions containing a polyhydroxy ether of a phenol-aldehyde resin which are particularly useful in the preparation of coating compositions. It is a further object to provide new compositions containing polyhydroxy ethers of phenol aldehyde resins which may be cured to form coatings having good resistance to solvents and corrosive liquids. It is a further object to provide new compositions containing polyhydroxy ethers of phenol-aldehyde resins which may be cured to form coatings having good flexibility and impact resistance. It is a further object to provide new compositions containing adducts of alkylene oxides and phenol-aldehyde resins which give coatings having improved resistance to alkali. These and other objects of the invention will be apparent from the following detailed description thereof.

It has now been discovered that these and other objects may be accomplished by the compositions of the invention comprising (1) a polyol comprising a polyhydroxy ether of a phenol-aldehyde resin, and (2) a methylol-substituted aromatic compound. It has been found that when these compositions are cured, particularly in the presence of acidic curing agents, they form hard tough films which have good resistance to solvents and corrosive liquids and have excellent flexibility and impact resistance. Evidence of such superior properties is presented in the examples at the end of the specification.

The polyols used in preparing the compositions of the present invention comprise the polyhydroxy ethers of phenol-aldehyde resins. The expression "polyhydroxy ethers" refers to plurality of hydroxy-containing radicals attached to the phenol-aldehyde resin through ether linkages. The polyhydroxy ether groups are preferably poly(hydroxyalkyl) ether groups and still more preferably poly(hydroxyethyl) ether groups.

The phenol-aldehyde resins used in the preparation of the polyhydroxy ethers are the soluble fusible resins obtained by reaction of phenolic materials with aldehydes according to conventional procedure. These resins are sometimes referred to as "novolac" resins. For the nature and preparation of these resins see Hunn, U.S. 2,330,217 and Carswell "Phenoplasts," 1947, page 29.

The phenolic materials used in preparing the phenol-aldehyde resins include monohydric and polyhydric phenols which may be mono- or polynuclear and may be substituted with various substituents, such as, for example, alkyl radicals, alkoxy radicals and the like. Examples of such phenols include, among others, phenol, 2,2-bis(4-hydroxyphenyl)propane, p-butyl phenol, p-octyl phenol, p-tertiary-butyl phenol, p-tertiary amyl phenol, p-hexyl phenol, p-isooctyl phenol, o,p-dibutyl phenol, o-phenyl phenol, 2-ethylhexyl phenol, diisobutyl-phenol, p-nonyl phenol, p-isononylphenol, 6-dodecylphenol, p-tetradecylphenol, p-stearyl phenol, p-eicosyl phenol, p-cyclohexyl phenol, meta-cresols and 3,5-xylenols, pentadecyl phenol, p-tert-butyl-o-cresol, p-tert-octyl m-cresol, resorcinol, catechol, pyrogallol, hydroquinone, di(hydroxyphenyl) sulfide, 1,5-dihydroxy naphthalene, p-octyl catechol, p-pentyl resorcinol, 4-cyclohexyl, 1,6-anthracenediol, 2,2-bis(4-hydroxyphenyl) pentane, and the like.

Particularly preferred phenols to be used in preparing the resins include the unsubstituted monohydric phenols and the hydrocarbyl-substituted monohydric phenols containing no more than 18 carbon atoms, and more particularly the phenols of the formula

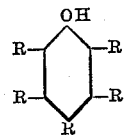

wherein R is selected from the group consisting of hydrogen and alkyl radicals which preferably contain no more than 10 carbon atoms, and at least two of the R's in the meta or para positions being hydrogen.

Aldehydes used in the preparation of the resins may be aliphatic, cycloaliphatic or aromatic monoaldehyde, such as, for example, acetaldehyde, acrolein, benzaldehyde, cyclohexanal, and the like. Formaldehyde, and materials which engender formaldehyde, such as, for example, paraformaldehyde and trioxane, are the general materials to be used in the reaction and are preferred.

Catalytic materials used in the resin forming reaction include, among others, alkali materials, such as sodium hydroxide, and acidic materials such as sulfuric acid, hydrochloric acid, p-toluenesulfonic acid, and the like. These materials are preferably utilized in amounts varying from about .1% to 6% by weight of reactants.

In preparing the resins, one may utilize a variety of proportions of the phenol and aldehyde. In most cases, it is preferred to react the phenol with at least an equal molecular quantity of the aldehyde, and, particularly when using the acidic catalysts, it is desirable to combine the aldehyde and phenol in mole ratios varying from 1:1.1 to 1:4.

The resin forming reaction is preferably accomplished by combining the reactants together in the presence of the above-noted catalysts and heating. Temperatures used in the reaction generally vary from about 60° C. to about 250° C., and more preferably from about 100° C. to 175° C. In case, the aldehyde is not soluble in the phenol or if the phenol is in solid form, it is generally desirable to conduct the reaction in the presence of inert solvents, such as benzene, toluene, and the like.

The phenol-aldehyde resins prepared as shown above vary from viscous liquids to solid brittle resins. They have at least 3 phenolic units separated by aliphatic bivalent radicals, and more preferably contain from 3 to 12 phenolic units separated by such groups. The preferred phenol-aldehyde resins prepared from the monohydric phenols and formaldehyde having the general structure

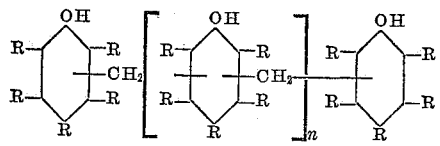

wherein the R's joined to ring carbon atoms which are not joined to the —CH$_2$— groups, are hydrogen or alkyl groups, and n is a whole integer of at least 1 and preferably from 1 to 9.

The preparation of the phenol-aldehyde resins by the above process is illustrated below:

PHENOL-FORMALDEHYDE RESIN 576 parts of phenol and 340 parts of 30% formaldehyde solution were mixed and 1.2 parts of sulfuric acid added. The mixture was slowly heated with stirring to 80° C. An exothermic reaction took place and the temperature went up to 100° C. The reaction mixture was then kept at 100° C. for 5 hours. The resin was then washed free of acid and the excess phenol steam distilled out. The resin was then dried under vacuum. Analysis indicated the resin possessed from 6 to 10 phenol OH groups.

P-CRESOL-FORMALDEHYDE RESIN 4.4 mols of p-cresol and 2.2 mols of formaldehyde as a 30% aqueous solution were mixed and 0.6 part concentrated sulfuric acid added. The mixture was then warmed to 35° C. for a short period and then heated to reflux and held there for 3 hours. The resulting product was then washed free of acid by stirring with repeated batches of hot distilled water. The excess p-cresol and steam distilled out and the resin dried under vacuum to 150° C. at 3 mm. The product when cooled was a light colored brittle resin. Analysis indicated the resin possessed from 6 to 10 phenol OH groups.

P-TERTIARY-OCTYL PHENOL-FORMALDEHYDE RESIN 6 mols of p-tertiary-octyl phenol and 3 mols of formaldehyde as a 30% solution were mixed and .6 part concentrated sulfuric acid added. The mixture was then heated to reflux and maintained there for 4 hours. The resulting product was then washed free of acid by stirring with repeated batches of hot distilled water. The excess tertiary octyl phenol was then removed and the resin dried under vacuum. The product was a light colored solid.

P-NONYL PHENOL-FORMALDEHYDE RESIN

This resin was prepared by the method shown in U.S. 2,330,217 using 663 parts of nonyl phenol, 226 parts of 37% formalin, 4 parts of oxalic acid and 1 part of the sodium salt of dioctyl sulfosuccinate. After mixing the materials in a flask fitted with a stirrer, the mixture was slowly heated to about 95° C. and held there for two hours. The contents of the flask were then subjected to distillation wherein water was removed as distillate while the temperature was slowly brought up to about 140° C. Heating was then continued for an additional hour and a half. The resulting novolac resin was a light yellow solid.

P-PENTADECYL PHENOL-FORMALDEHYDE RESIN

This resin was prepared by mixing 304 parts of pentadecyl phenol, 72 parts of 37% formalin, 2 parts of oxalic acid and 0.5 part of the sodium salt of dioctyl sulfosuccinate in a flask and heating to about 95° C., at which temperature the mixture was stirred for two hours. The water was then slowly distilled out while bringing the temperature up to 150° C. in the course of two hours. The mixture was held at about 150° C. for an additional hour and cooled. The resulting resin was a light yellow solid.

The polyhydroxy ethers of the above-described phenol-aldehyde resins may be prepared by a variety of methods. The may be prepared, for example, by reacting the phenol-aldehyde resin with monoepoxy compounds. Examples of these materials include the alkylene oxides, such as, for example, ethylene oxide, proplyene oxide, butylene oxide, and the alkylene oxide derivatives such as glycidyl, epichlorohydrin, glycidyl ethers as phenyl glycidyl ether, amyl glycidyl ether, allyl glycidyl ether, naphthyl glycidyl ether, and other derivatives, such as styrene oxide, monoglycidyl esters of monocarboxylic acids, as glycidyl methacrylate, glycidyl acetate, glycidyl benzoate, and the like. The more preferred monoepoxides to be used are the alkylene oxides, and particularly ethylene oxide.

The reaction between the phenol-aldehyde resin and the monoepoxide is usually catalyzed by the presence of an alkyline material, such as for example, caustic potash, caustic soda, sodium carbonate, sodium methylate, or the like. These materials are preferably employed in amounts varying from .1% to 4%, and more preferably from .2% to 3% by weight of reactants.

The reaction is also preferably conducted in the presence of inert diluents or solvents, such as, for example, benzene, xylene, toluene, ethanol, butanol, pentanol, butyl acetate, and the like, and mixtures thereof.

The temperatures used in the reaction may vary from room temperature to as high or higher than 200° C. Preferably the reaction is accomplished at temperatures ranging from 70° C. to 150° C. The reaction may be conducted with or without pressure as desired. If pressures are utilized, they preferably vary from about 10 to 200 pounds per square inch.

After the reaction is complete, the solvent or diluent and any excess monoepoxide may be removed by conventional means, such as distillation, to yield the desired polyhydroxylated product.

The preparation of the polyhydroxy-containing phenol-aldehyde derivative by the above process is illustrated below.

*Polyol A.—Adduct of ethylene oxide and phenol-formaldehyde resin*

582 parts of the phenol-formaldehyde resin produced as shown above is mixed with 200 parts of xylene and 12 parts of sodium methylate. This mixture is placed in an autoclave and 300 parts of ethylene oxide added. The temperature is raised from 150° C. to 160° C. The autoclave is stirred rapidly during this period and the maximum pressure remained between 150–185 lbs. per square inch. At the end of about 4 hours, the autoclave is cooled to room temperature. At the end of this period, the ethylene oxide is substantially completely reacted so as to introduce about one mole of ethylene oxide for every phenolic OH group present on the resin. About one —OCH$_2$CH$_2$OH group in ten is further substituted with an additional ethylene oxide group to form the structure —OCH$_2$CH$_2$OCH$_2$CH$_2$OH. The adduct has a softening point of about 88° C.

*Polyol B.—Adduct of ethylene oxide and p-cresol formaldehyde resin*

The same procedure as above is repeated using equivalent amounts of the p-cresol formaldehyde resin prepared as above and ethylene oxide. This product is a dark colored solid.

*Polyol C.—Adduct of ethylene oxide and p-tert-octyl phenol-formaldehyde resin*

The same procedure as above is repeated using equivalent amounts of the p-tert-octyl phenol formaldehyde resin prepared as above and ethylene oxide. This product is a yellow brittle solid.

*Polyol D.—Adduct of ethylene oxide and p-nonyl phenol-formaldehyde resin*

The same procedure as above is repeated using equivalent amounts of the p-nonyl phenol-formaldehyde resin prepared as above and ethylene oxide.

*Polyol E.—Adduct of ethylene oxide and p-pentadecyl phenol-formaldehyde resin*

The same procedure as above is repeated using equivalent amounts of the p-pentadecyl phenol formaldehyde resin prepared as shown above and ethylene oxide.

The polyhydroxy ethers may also be prepared by reacting the phenol-aldehyde resins with a chlorohydrin in the presence of alkaline catalyst, such as sodium hydroxide as exemplified by the following:

48 parts of sodium hydroxide was dissolved in 200 parts of water and 100 parts of ethanol and 118 parts of the p-cresol formaldehyde resin prepared as shown above. The resin dissolved in this solution and the temperature then raised to 80° C. and 96.5 parts of ethylene chlorohydrin added over 30 minute period. The product was refluxed at about 90° C. for 3.5 hours. The resin was removed and washed with fresh water and dried at 130° C.

The polyhydroxy ethers may also be prepared by reacting the phenol-aldehyde resin with epichlorohydrin in the presence of caustic to form a polyglycidyl ether thereof and then hydrolyzing some or all of the glycidyl ether groups.

The polyhydroxy ethers of the phenol-aldehyde resins will vary from viscous liquids to hard solids. They will have substantially the same structure as the starting phenol-aldehyde resin with the exception that at least two and preferably two to 10 of the phenol OH groups are converted to hydroxy-containing ether groups. The polyhydroxy-containing derivative of the preferred phenol-formaldehyde resins described above have the general formula

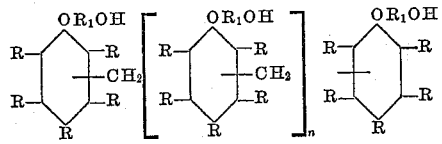

wherein the R's joined to ring carbon atoms not joined to the —CH$_2$— groups are hydrogen or alkyl groups, $n$ is an integer of at least 1 and preferably 1 to 10, and R$_1$ is bivalent radical derived from the monoepoxide or chlorohydrin. In the case of the alkylene oxides, the R$_1$ in the formula is an alkylene group preferably containing up to 4 carbon atoms. The products may also contain small amounts of macromolecules wherein more than one more of the monoepoxides or chlorohydrin groups has added to one phenolic OH group so that the phenolic units may appear as

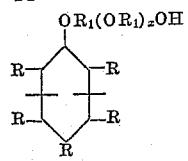

wherein $x$ is 2 or more.

The other component used in preparing the compositions of the present invention comprise the methylol-substituted aromatic compounds. The compounds contain at least 2 of the methylol groups but may contain only one methylol group if they have additional functional groups, such as the hereinafter described allylic groups. The aromatic nucleus may contain one or more aromatic rings which may be fused and the rings may be substituted with additional groups as, for example, ether, ester groups, alkyl groups and the like. Examples of these materials include, among others, allyloxy-2,4,6-tri(hydroxymethyl)benzene, hydroxy-2,4,6-tri(hydroxymethyl)benzene, butyloxy-2,4,6-tri(hydroxymethyl)benzene, cyclohexyl-2,4,6-tri(hydroxymethyl)benzene, hydroxy-2,4,6-tri(hydroxymethyl)-3,5-dibutylbenzene, hydroxy-2,6-di(hydroxymethyl)benzene, hydroxy-2,6-di(hydroxymethyl)chlorobenzene, methallyloxy-2,6-di(hydroxymethyl)benzene, chloroallyl-2,4,6-tri(hydroxymethyl)benzene, hydroxy-2,6-di(hydroxymethyl)octylbenzene, hydroxy-2,6-di(hydroxymethyl)3,5-diisopropylbenzene, and the like, and mixtures thereof.

Particularly preferred polymethylol aromatic compounds to be used in making the compositions of the invention comprise those of the formula

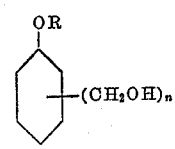

wherein R is hydrogen or an aliphatic, cycloaliphatic or aromatic hydrocarbon radical and their halogen-substituted derivatives and $n$ is an integer equal to from 2 to 3.

It is also desirable in some cases to etherify some of the —CH$_2$OH groups with aliphatic monohydric alcohols, such as butanol, pentanol, hexanol, octanol, and the like, in order to improve the solubility of the products in conventional solvents. These preferred polymethylol aromatics may be exemplified by the following formula

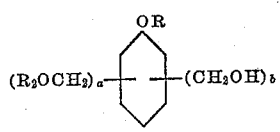

wherein $b$ is at least 1 and preferably 2 and $a+b=3$, R$_2$ is an aliphatic hydrocarbon radical containing up to 8 carbon atoms and R is as above.

If the compositions are to be used as coatings for cans, the preferred polymethylol compound to be used comprises the polymethylol phenol allylic ethers and especially the 2-alkenyloxy benzenes containing from 1 to 3 methylol groups substituted on the benzene ring. The 2-alkenyl radical in the compound has an olefinic double bond between the beta and gamma carbon atoms, the saturated alpha carbon atom being linked to the ether oxygen atom. Among typical 2-alkenyl radicals contained in the compounds are allyl, methallyl, crotyl, 2-pentenyl, 2-methyl-2-butenyl, 3-methyl-2-butenyl, 2-hexenyl or like groups. If desired, the 2-alkenyl radical may contain one or more halogen substituents as is the case with 2-chloroallyl, 3-chloroallyl, 2-bromoallyl, 2-chloro-2-methylallyl, 2,3-dichloroallyl and like groups. It is preferred to employ a compound containing three methylol groups linked to the benzene ring, but other compounds containing only one or two methylol groups linked singly to any one of the 2, 4 and 6 positions are also suitable. Although substantially pure compounds can be used, it is more usual that a mixture of the 2-alkenyloxy compounds be contained in the composition. This is because the product of the compound, which is effected in known manner, normally gives a mixture which is equally suitable. The produced mixture normally contains a 2-alkenyloxybenzene having three methylol groups linked singly at the 2, 4 and 6 positions on the benzene ring in admixture with a minor proportion of the 2-alkenyloxybenzene having one to two methylol groups linked singly at the 2, 4 and 6 positions of the benzene ring. Normally the 2-alkenyl radicals in the mixture of compounds are the same for each. Especially suitable compounds of the class, whether used singly or as mixtures, are those wherein the 2-alkenyl radical is the allyl group. Reference is made particularly to allyloxy-2,4,6-tri(hydroxymethyl)benzene.

The proportions in which the polyhydroxy ether of the phenolaldehyde resin and the polymethylol aromatics are utilized in the composition will be governed by the use of the composition. Thus, while the weight ratio of the two components can vary, for example, from about 9:1 to 1:9, it is customary in the surface coating applications to employ compositions containing a minor proportion of the methylol product. Excellent results have been obtained with compositions containing from 20% to 45% by weight of the methylol product.

Since one of the principal uses of the composition is as a surface coating material in cured condition and application to a surface is usually effected with a solution of the composition, it is convenient to prepare the composition with the use of mutual solvents. Various normally liquid organic compounds are suitable for this purpose including ketones such as methyl ethyl ketone, methyl isobutyl ketone, mesityl oxide, cyclohexanone, isophorone, etc.; ethers and ether-esters of glycols such as monomethyl, monoethyl and monobutyl ether of ethylene glycol, diethylene glycol, and propylene glycol and the corresponding acetates and propionates; halogenated hydrocarbons such is ethylene dichloride, trichloropropane, etc. Instead of using only active solvents, it is more customary to utilize a mixture of one or more active solvents with one or more diluents. For this purpose, aromatic hydrocarbons are suitable, such as benzene, toluene, xylene, etc. Alcohols such as ethanol, isopropyl alcohol, sec-butyl alcohol, n-butanol and methyl isobutyl carbinol are also useful constituents of the solvent mixture. In solutions of the composition of the invention for surface coating purposes, solutions of suitable spraying or brushing viscosity are employed that contain about 20% to 60% of the composition.

The cure of the compositions is effected by addition of a catalyst. Acid or acid engendering agents are particularly useful. Examples of such agents include, among others, phosphoric acid, hydrochloric, maleic, oxalic, butyl hydrogen phosphate, ethyl hydrogen phosphate, cresyl hydrogen phosphate, butyl titanate, 2-ethyl hexyl titanate, p-toluenesulfonic acid, benzenedisulfonic acid, and the like. Other suitable catalysts include materials which are acidic at the temperature of cure, such as ammonia or amine salts of sulfuric or sulfonic acids, e.g., ammonium salts of p-toluenesulfonic acid, p-phenol sulfonic acid, o-phenol sulfonic acid; the morpholine salts of p- and/or o-phenol sulfonic acid, the urea salt of ortho and/or para phenol acid, the urea salt of ortho and/or para phenol sulfonic acid, of p-toluenesulfonic acids the mono urea, morpholine and ethanol amine salts of sulfuric acid.

Various amounts of the catalyst may be used, but amount preferably varies from 0.2% to 5% by weight. The acids, such as phosphoric acid, are particularly effective when added in amounts varying from about 0.5% to 2% by weight.

The compositions containing the acidic curing agent undergo cure by heating at about 250° F. to 450° F. The time needed for complete cure will vary inversely with the temperature. Thus, while 60 minutes time may be needed at 300° F. only 10 minutes are required at 400° F. In general, heating is continued until cure is complete as evidenced by development of insolubility of the product in methyl ethyl ketone, which is an active solvent for the uncured composition.

In using the composition of the invention, various other substances can be incorporated therewith besides solvents and curing agents. Reference is made to incorporation of such materials as pigments, other resins, plasticizers, fillers and dyes.

It has been found useful to include about 0.2% to 3%, preferably about 0.5% to 2% of a polyvinyl acetal resin with compositions employed for surface coating purposes. The compositions applied as solutions to surfaces have some tendency to "crawl" which is formation of regions of different thickness of film. Although various polyvinyl acetal resins are suitable for overcoming the crawling of the film, it is preferred to employ polyvinyl acetal resins of saturated aldehydes (alkanols) of 2 to 4 carbon atoms, of which polyvinyl butyral resin has been found preferable.

It has also been found useful to add organopolysiloxanes to the compositions to prevent "crawling." The organopolysiloxanes comprise silicon-containing products having a plurality of repeating units of

wherein R is an organic radical and preferably a hydrocarbon radical, such as, for example, alkyl, cycloalkyl, alkcycloalkyl, aryl, alkaryl, aralkyl and the like radicals, such as methyl, ethyl, butyl pentyl, cyclohexyl, phenyl, methylphenyl, isopropylphenyl, phenylmethyl, octyl, isooctyl, decyl cyclohexenyl, allyl and the like. Preferred organopolysiloxanes are those possessing at least 3 and more preferably 3 to 60 of the repeating units.

wherein the $R_1$'s are alkyl, aryl, alkaryl, or a mixture thereof, such as, for example, the methylpolysiloxanes, ethylpolysiloxanes, methylphenyl-polysiloxanes, phenyl polysiloxanes, xylylpolysiloxanes, methylbutyl-polysiloxanes, octylpolysiloxanes, butylhexylpolysiloxanes, and the like. Particularly preferred organopolysiloxanes are the linear polymeric fluids having from 1 to 2 hydrocarbon radicals per silicon atom, viscosities varying from about 110 centistokes to about $1.0^5$ centistokes (at 25° C.) and flash points (ASTM D-92-33) varying from about 100° F. to 800° F. The preparation of the above-described organopolysiloxanes is described in McGregor "Silicones and Their Uses," McGraw-Hill, 1946, pages 261, et seq. U.S. 2,384,384, U.S. 2,432,665 and U.S. 2,521,674.

To illustrate the manner in which the invention may be carried out, the following examples are given. It is to be understood, however, that the examples are for the purpose of illustration and the invention is not to be regarded as limited to any of the specific conditions or materials recited therein. Unless otherwise indicated, parts disclosed in the examples are parts by weight.

The allyloxy-2,4,6-tri(hydroxymethyl)benzene referred to in the examples contain a minor proportion of allyloxybenzenes having one and two methylol groups linked singly at the 2, 4 or 6 positions on the benzene ring.

EXAMPLE I

This example illustrates the preparation of a coating composition from polyol A, allyloxy-2,4,6-tri(hydroxymethyl)benzene and phosphoric acid as the curing agent.

A 30% solids composition was prepared by adding 73.1% w. of polyol A, 24.4% allyloxy-2,4,6-tri(hydroxymethyl)benzene, 1.0% methylphenylpolysiloxane (silicone resin SR-82) and 1.5% phosphoric acid to a solvent medium comprising dipropylene glycol methyl ether. Polyol A was first dissolved in the solvent and then the allyloxy-2,4,6-tri(hydroxymethyl)benzene added thereto. The methylphenylpolysiloxane was next added as a 10% solution in the above solvent and then the phosphoric acid added with agitation as a 10% solution in the above solvent.

The above composition was flowed out on 22 gauge cold rolled steel panels and curing was effected by baking for 15 minutes at 400° F. The final product was a clear uniform film having good solvent and chemical resistance, good abrasion resistance and excellent flexibility and impact resistance. Results of some of the tests are shown below:

Impact test (160 inch lbs. max.)—160 in lbs.
Flexibility (⅛ inch maximum)—⅛ inch
Methyl ethyl ketone resistance—19 hours
Boiling 20% sodium hydroxide (4 hours)

EXAMPLE II

Example I was repeated with the exception that 62.7% of polyol A was used instead of 73.1%, and 37.5% of allyloxy-2,4,6-tri(hydroxymethyl)benzene was used instead of 24.4%. The film cured on steel panels with phosphoric acid had good solvent and chemical resistance, good hardness, toughness and abrasion resistance and excellent flexibility and impact resistance.

EXAMPLE III

Example I was repeated with the exception that the phosphoric acid curing agent was employed in amounts of 2.5% instead of 1.5%. The film cured on steel panels with phosphoric acid had good solvent and chemical resistance and excellent flexibility and impact resistance.

EXAMPLE IV

This example illustrates the preparation of a coating composition from polyol A, allyloxy-2,4,6-tri(hydroxymethyl)benzene and 1.5% butyl hydrogen phosphate as curing agent.

A 30% solids composition was prepared by adding 73.1% of polyol A, 24.4% allyloxy-2,4,6-tri(hydroxymethyl)benzene, 1.0% methylphenylpolysiloxane and 1.5% butyl hydrogen phosphate to a solvent medium comprising dipropylene glycol methyl ether. The materials were compounded as shown in Example I.

This resulting composition was then flowed out on cold rolled steel panels and curing was effected by baking for 15 minutes at 400° F. The final product was a clear uniform film which was hard and tough and had good solvent and chemical resistance, good abrasion resistance and excellent flexibility and impact resistance. Results of some of the tests are shown below:

Impact test _____ lbs __ 160
Flexibility _____ inches __ ⅛

EXAMPLE V

This example illustrates the preparation of a coating from polyol A, allyloxy-2,4,6-tri(hydroxymethyl)benzene and 1.5% tin naphthenate as a curing agent.

A 30% solids composition was prepared by adding 73.1% of polyol A, 24.4% allyloxy-2,4,6-tri(hydroxymethyl)benzene, 1.0% methylphenylpolysiloxane and 1.5% tin naphthenate to a solvent medium comprising Dowanol 33–B. The materials were compounded as shown in Example I.

The resulting composition was then flowed out on steel panels and cured by baking 15 minutes at 400° F. The final product was a clear uniform film which was hard and tough and had good solvent and chemical resistance, good abrasion resistance and excellent flexibility and impact resistance. Results of some of the tests are shown below:

Impact test _____ lbs __ 160
Flexibility _____ inches __ ⅛

EXAMPLE VI

Example V was repeated with the exception that 62.7% of polyol A was used instead of 73.1% and 37.5% of the polymethylol aromatic was used instead of 24.4%. The film cured on steel panels with phosphoric acid was hard and flexible.

EXAMPLE VII

Example V was repeated with the exception that the phosphoric acid curing agent was employed in amounts of 2.5% instead of 1.5%. The cured film was hard and flexible.

EXAMPLE VIII

This example illustrates the preparation of a coating composition from polyol B, allyloxy-2,4,6-tri(hydroxymethyl)benzene and butyl hydrogen phosphate.

A 30% solids composition was prepared by adding 75% of polyol B, 25% allyloxy-2,4,6-tri(hydroxymethyl)benzene, 1.0% methylphenylpolysiloxane and 1.5% butyl hydrogen phosphate to a solvent medium comprising dipropylene glycol methyl ether. The compounding was done as in Example I.

The above composition is flowed out on steel panels and cured by heating for 15 minutes at 400° F. The final product is a clear flexible film.

EXAMPLE IX

This example illustrates the preparation of a coating composition from polyol C, allyloxy-2,4,6-tri(hydroxymethyl)benzene and butyl hydrogen phosphate.

A 30% solids composition was prepared by adding 75% of polyol C, 25% allyloxy-2,4,6-tri(hydroxymethyl)benzene, 1.0% methylphenylpolysiloxane and 1.5% butyl hydrogen phosphate to a solvent medium comprising dipropylene glycol methyl ether. The compounding was done as in Example I.

The above composition is flowed out on steel panels and cured by heating for 15 minutes at 400° F. The final product is a clear hard flexible film.

EXAMPLE X

A pigmented coating composition is prepared by grinding 23% by weight of chromium oxide pigment and 73% by weight of vehicle in solution of organic solvent, the vehicle consisting of 73.1 parts of resin A, 24.4 parts of allyloxy-2,4,6-tri(hydroxymethyl)benzene, 1.0 part of polyvinyl butyral (butvar B–76) and 1.5 parts of phosphoric acid. The composition is flowed out on steel panels and cured by baking for 10 minutes at 400° F. The resulting films are very hard and tough and have good flexibility and impact resistance.

We claim as our invention:

1. A curable composition comprising a mixture of (1) a polyol consisting of a fusible phenol-formaldehyde resin having from 3 to 12 phenolic units separated by —$CH_2$— groups wherein at least two of the phenolic OH groups have been converted to —$OR_1OH$ groups wherein $R_1$ is an alkylene group containing up to 4 carbon atoms, and (2) an 2-alkenyloxybenzene containing a single alkenyloxy group and being substituted on from 1 to 3 of the ring positions 2, 4 and 6 relative to the alkenyloxy group with —$CH_2OH$ groups, the components defined in (1) and (2) above being combined in a weight ratio of 9:1 to 1:9.

2. A composition as in claim 1 wherein the 2-alkenyloxybenzene defined in (2) is allyloxy-2,4,6-tri(hydroxymethyl)benzene.

3. A composition as in claim 1 wherein the fusible phenol-formaldehyde resin defined in (1) has at least two of the phenolic OH groups converted to —$OC_2H_4OH$ groups.

4. A composition comprising the curable composition defined in claim 1 and 0.2% to 5% by weight of an acidic curing agent.

5. A composition comprising the curable composition defined in claim 1 and 0.2% to 5% by weight of phosphoric acid as a curing agent.

References Cited in the file of this patent

UNITED STATES PATENTS

| | | |
|---|---|---|
| 2,562,953 | Rust | Aug. 7, 1951 |
| 2,574,538 | De Groote et al. | Nov. 13, 1951 |
| 2,579,331 | Martin | Dec. 18, 1951 |
| 2,606,935 | Martin | Aug. 12, 1952 |